United States Patent
Tanaka et al.

(10) Patent No.: US 12,397,724 B2
(45) Date of Patent: *Aug. 26, 2025

(54) WIRE HARNESS

(71) Applicant: SUMITOMO WIRING SYSTEMS, LTD., Yokkaichi (JP)

(72) Inventors: Kosuke Tanaka, Yokkaichi (JP); Ryuta Saito, Yokkaichi (JP); Katsutoshi Izawa, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 189 days.

This patent is subject to a terminal disclaimer.

(21) Appl. No.: 17/989,950

(22) Filed: Nov. 18, 2022

(65) Prior Publication Data

US 2023/0166671 A1 Jun. 1, 2023

(30) Foreign Application Priority Data

Nov. 26, 2021 (JP) ................................. 2021-192266

(51) Int. Cl.
*H01B 7/40* (2006.01)
*B60R 16/02* (2006.01)
*H01B 7/36* (2006.01)

(52) U.S. Cl.
CPC ........... *B60R 16/0215* (2013.01); *H01B 7/36* (2013.01); *H01B 7/40* (2013.01)

(58) Field of Classification Search
CPC ........ H02G 3/04; H02G 3/06; B60R 16/0215; H01B 7/02; H01B 7/04; H01B 7/17; H01B 7/30; H01B 7/36–7/368; H01B 7/40; H01B 7/0045
See application file for complete search history.

(56) References Cited

U.S. PATENT DOCUMENTS

| | | | | |
|---|---|---|---|---|
| 4,563,542 A * | 1/1986 | Pollack | .................. | H02G 3/266 |
| | | | | 174/68.3 |
| 5,681,191 A * | 10/1997 | Robicheau | ............. | H01R 4/646 |
| | | | | 439/877 |
| 7,740,211 B2 * | 6/2010 | Dukes | ...................... | H02G 1/08 |
| | | | | 248/74.1 |
| 8,505,858 B2 * | 8/2013 | Hansen | .................. | F16L 3/1226 |
| | | | | 174/664 |
| 9,680,235 B2 * | 6/2017 | Kawamura | .............. | H01R 4/62 |

(Continued)

FOREIGN PATENT DOCUMENTS

| | | | | |
|---|---|---|---|---|
| JP | H1182813 A | * | 3/1999 | ............... F16L 11/11 |
| JP | 2009038899 | * | 2/2009 | ............... H02G 3/30 |
| JP | 2013-055760 A | | 3/2013 | |

OTHER PUBLICATIONS

English Translation of Yasunori, JPH1182813, Mar. 26, 1999 from Espacenet, dated Jul. 12, 2024. (Year: 1999).*

*Primary Examiner* — Timothy J Thompson
*Assistant Examiner* — Paramita Ghosh
(74) *Attorney, Agent, or Firm* — Oliff PLC

(57) ABSTRACT

A wire harness including; a wire harness main body including an electric wire and an exterior tube that covers an outer circumferential surface of the electric wire; a path restrictor that is attached to an outer circumferential surface of the exterior tube and restricts a path of the wire harness; and an attachment attached to an outer circumferential surface of a portion in a lengthwise direction of the path restrictor.

11 Claims, 8 Drawing Sheets

(56) References Cited

U.S. PATENT DOCUMENTS

2014/0196929 A1   7/2014  Okuhara
2014/0238719 A1*  8/2014  Inao .................... B60R 16/0207
                                                                174/112

* cited by examiner

WIRE HARNESS

BACKGROUND

The present disclosure relates to a wire harness.

Conventionally, a wire harness that includes: a wire harness main body that includes an electric wire member and an exterior member that covers the electric wire member; and a path restricting member that is attached to an outer circumferential surface of the exterior member and is configured to restrict the path of the wire harness main body, has been known as a wire harness for a vehicle (for example, see JP 2013-55760A).

SUMMARY

Incidentally, in the above-described wire harness, it is desired to improve the connection reliability of the path restricting member with respect to another member such as the exterior member.

An exemplary aspect of the disclosure provides a wire harness capable of improving the connection reliability between the path restricting member and another member.

The wire harness of the present disclosure includes: a wire harness main body including an electric wire and an exterior tube that covers an outer circumferential surface of the electric wire; a path restrictor that is attached to an outer circumferential surface of the exterior tube and restricts a path of the wire harness; and an attachment attached to an outer circumferential surface of a portion in a lengthwise direction of the path restrictor, wherein: the path restrictor includes a first main body that covers a portion of the outer circumferential surface of the exterior tube and an insertion port that is open in a direction orthogonal to a lengthwise direction of the first main body and extends over an entire length in the lengthwise direction of the first main body, the path restrictor has a connection connected to the attachment, the attachment has a cover that covers an outer circumferential surface of the connection, and the cover has a mark indicating a necessary minimum insertion amount of the path restrictor into the cover in a lengthwise direction of the wire harness main body.

According to the wire harness of the present disclosure, an effect of being able to improve the reliability of connection between the path restricting member and other members is exhibited.

DETAILED DESCRIPTION OF EMBODIMENTS

Description of Embodiments of Present Disclosure

Figure 1:
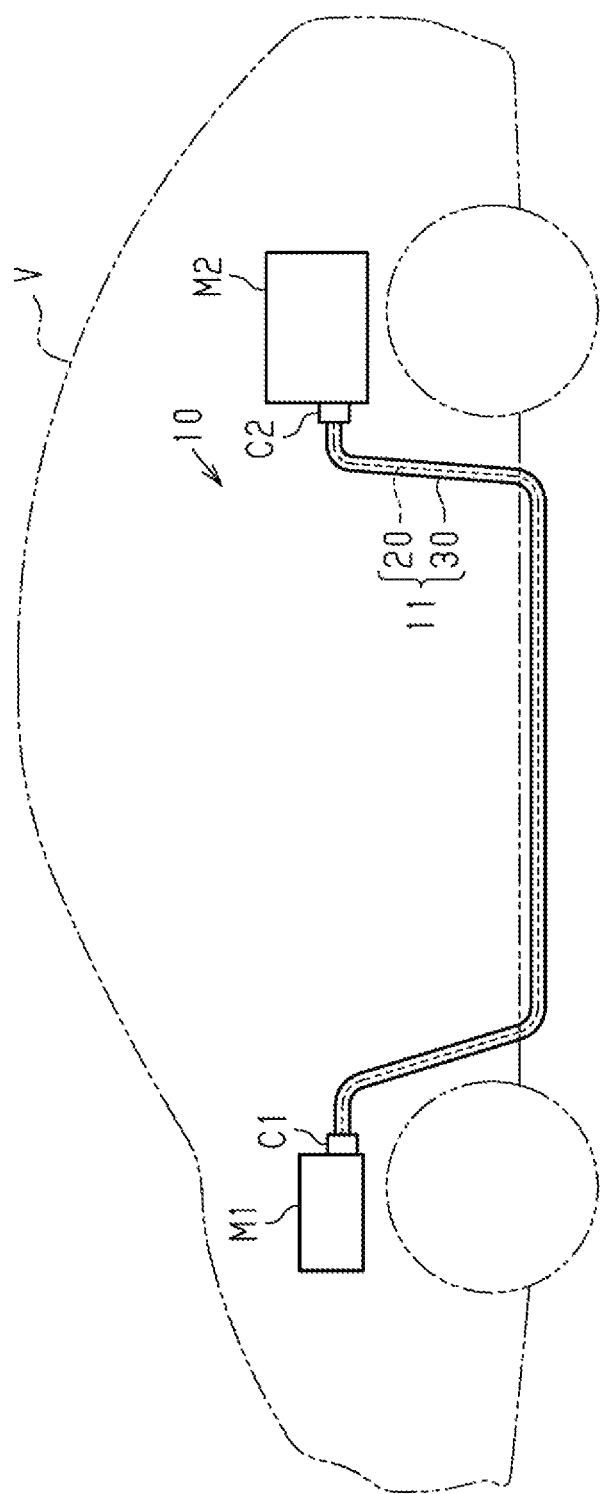
FIG. 1 is a schematic configuration diagram showing a wire harness of an embodiment.

First, embodiments of the present disclosure will be listed and described.

[1] The wire harness of the present disclosure includes: a wire harness main body including an electric wire member and an exterior member that covers an outer circumferential surface of the electric wire member; a path restricting member that is attached to an outer circumferential surface of the exterior member and restricts a path of the wire harness; and an attachment member attached to an outer circumferential surface of a portion in a lengthwise direction of the path restricting member, in which the path restricting member includes a first main body portion that covers a portion of the outer circumferential surface of the exterior member and an insertion port that is open in a direction orthogonal to a lengthwise direction of the first main body portion and extends over the entire length in the lengthwise direction of the first main body portion, the path restricting member has a connection portion connected to the attachment member, the attachment member has a covering portion that covers an outer circumferential surface of the connection portion, and the covering portion has a mark indicating a necessary minimum insertion amount of the path restricting member into the covering portion in a lengthwise direction of the wire harness main body.

According to this configuration, the connection portion of the path restricting member and the covering portion of the attachment member are provided so as to overlap each other in the lengthwise direction of the wire harness main body. At this time, the mark indicating the necessary minimum insertion amount of the path restricting member into the covering portion is provided on the covering portion that covers the outer circumferential surface of the connecting portion. For this reason, during the task of inserting the path restricting member into the covering portion, it is possible to easily confirm the position corresponding to the minimum insertion amount of the path restricting member into the covering portion based on the mark. Accordingly, by inserting the path restricting member into the covering portion while confirming the mark, the path restricting member can be suitably inserted into the covering portion by a necessary minimum insertion amount or more. As a result, it is possible to suitably suppress detachment of the path restricting member from the covering portion. As a result, it is possible to improve the connection reliability between the path restricting member and the attachment member. Note that, for example, an uneven structure, engraving, printing, or the like can be used as the mark.

[2] It is preferable that the covering portion has a restricting wall that is engageable with a first end surface in the lengthwise direction of the path restricting member, in the lengthwise direction of the wire harness main body. According to this configuration, when the first end surface of the path restricting member is engaged with the restricting wall, relative movement of the path restricting member with respect to the attachment member is suppressed in the lengthwise direction of the wire harness body. For this reason, when the first end surface is engaged with the restricting wall, it is possible to suppress insertion of the path restricting member farther than the restricting wall of the attachment member. In other words, the restricting wall can function as a mark indicating the maximum insertion amount of the path restricting member into the covering portion in the lengthwise direction of the wire harness main body. As a result, the path restricting member can be inserted into the covering portion using the mark and the restricting wall as guides. According to this, by inserting the path restricting member into the covering portion such that the first end surface is positioned between the mark and the restricting wall, the path restricting member can be suitably inserted into the covering portion up to a desired position. As a result, it is possible to improve the efficiency of the task of inserting the path restricting member into the covering portion, and therefore it is possible to improve the assembly workability of the wire harness.

[3] It is preferable that the restricting wall is provided at one end portion in a lengthwise direction of the covering portion, the covering portion has a second end surface of an end portion on a side opposite to the restricting wall out of the two end portions in the lengthwise direction of the covering portion, the mark is provided spaced apart from the second end surface by a first distance in the lengthwise direction of the wire harness main body, and the first distance is a distance corresponding to the minimum insertion amount. According to this configuration, the mark is provided spaced apart by the first distance corresponding to the minimum insertion amount from the second end surface provided on the side opposite to the regulating wall in the lengthwise direction of the covering portion. Based on such a mark and the restricting wall, it is possible to easily confirm the positions corresponding to the minimum insertion amount and the maximum insertion amount of the path restriction member with respect to the covering portion.

[4] It is preferable that the covering portion is formed in a ring shape that encloses, in a circumferential direction, the entirety of the outer circumferential surface of the connection portion and the entirety of the outer circumferential surface of the exterior member at a portion where the connection portion is attached, and the covering portion has a second main body portion that covers a portion of the outer circumferential surface of the first main body portion, and a lid portion that is coupled to the second main body portion. According to this configuration, since the covering portion is ring-shaped and the covering portion is divided into the second main body portion and the lid portion, the attachment member including the covering portion can be retrofitted to the path restricting member and the exterior member. As a result, the assembly workability of the wire harness can be improved.

[5] It is preferable that the mark is provided on an inner surface of the second main body portion. According to this configuration, since the mark is provided on the inner surface of the second main body portion, when inserting the path restricting member into the second main body portion, the position of the mark can be easily confirmed visually. Furthermore, it is easy to visually confirm the positional relationship between the mark and the first end surface of the path restricting member. As a result, the workability when inserting the path restricting member into the covering portion can be improved, and the path restricting member can be preferably inserted into the covering portion by the necessary minimum insertion amount or more.

[6] It is preferable that the mark extends over the entirety of a circumferential surface of the second main body portion in a circumferential direction of the covering portion. According to this configuration, since the mark is formed in a wide range in the circumferential direction of the covering portion, it is easier to visually confirm the position of the mark.

[7] It is preferable that the mark has a recess that is recessed from the inner surface of the second main body portion, and the recess is a recess that does not pass through the second main body portion in a radial direction of the covering portion. According to this configuration, since the recess serving as the mark does not pass through the second main body portion in the radial direction, the recess can be formed in a wide range in the circumferential direction of the covering portion. Also, since the recess is formed so as to be recessed from the inner surface of the second main body portion, it is possible to suitably suppress a case in which the recess hinders insertion of the path restricting member into the second main body portion.

[8] It is preferable that the second main body portion has a third end surface and a fourth end surface, which are both end surfaces in a circumferential direction of the second main body portion, and the mark is provided on at least one of the third main body portion and the fourth main body portion. According to this configuration, the mark is provided on at least one of the third end surface and the fourth end surface of the lid portion. For this reason, even after the path restricting member is inserted into the second main body, the mark can be visually confirmed. This makes it possible to easily confirm the positional relationship between the first end surface of the path restricting member and the mark even after the path restricting member is inserted into the second main body portion.

[9] It is preferable that when the path restricting member is a first path restricting member, the attachment member is a second path restricting member that is attached to an outer circumferential surface of the exterior member and restricts the path of the wire harness main body, the connection portion is provided at an end portion in a lengthwise direction of the first path restricting member, the covering portion is provided at an end portion in a lengthwise direction of the second path restricting member, the first path restricting member restricts a path of a straight section, which is a portion with a linear shape in the path of the wire harness main body, and the second path restricting member restricts a path of a bent section, which is a portion with a bent shape in the path of the wire harness main body. According to this configuration, the path of the straight section is restricted by the first path restricting member, and the path of the bent section is restricted by the second path restricting member. As a result, it is possible to suppress deviation of the path of the straight section and the path of the bent section from desired paths.

Detailed Description of Embodiments of the Present Disclosure

A specific example of the wire harness of the present disclosure will be described below with reference to the drawings. In each drawing, some configurations may be exaggerated or simplified for convenience of description. Also, the dimensional ratio of each portion may differ in each drawing. "Orthogonal", "parallel" and "entire length" in this specification include not only the case of being strictly orthogonal, parallel and the entire length, but also the case of being approximately orthogonal, parallel, and the entire length within a range where the effects in this embodiment are exhibited. In the present specification, the term "equal" includes not only the case of being exactly equal, but also the case where there is a slight difference between objects being compared due to the influence of a dimensional tolerance or the like. Also, the term "tubular shape" used in the description of this specification includes not only a shape obtained by forming a circumferential wall continuously over the entire length in the circumferential direction, but also a shape in which a plurality of parts are combined to form a tubular shape, and a shape having a notch or the like in a portion in the circumferential direction, like a C shape. Note that "tubular" shapes include, but are not limited to, circles, ovals, and polygons with pointed or rounded corners. Also, the term "ring-shaped" used in the description of this specification may refer to any structure that forms a loop, a continuous shape without ends, as well as a structure that is generally loop-shaped with a gap, such as a C shape. Note that "ring-shaped" shapes include, but are not limited to, circles, ovals, and polygons with pointed or rounded corners. Also, the term "opposing" in this specification refers to surfaces or members being located in front of each other, and includes not only a case where the surfaces or members are located completely in front of each other, but also a case where the surfaces or members are partially located in front of each other. Also, "opposing" in this specification includes both a case where a member different from two portions is interposed between the two portions, and a case where nothing is interposed between the two portions. Note that the present disclosure is not limited to these examples, but is indicated by the scope of the claims, and is intended to include all modifications that fall within the scope and meaning equivalent to the scope of the claims.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 is formed in an elongated shape so as to extend in a front-rear direction of the vehicle V, for example. The wire harness 10 is routed in the vehicle V so that, for example, an intermediate portion in the lengthwise direction of the wire harness 10 passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to the motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular exterior member 30 (exterior tube) that encloses the outer circumferential surface of the electric wire member 20. The wire harness 10 has connectors C1 and C2 that are respectively attached to two end portions of the electric wire member 20. One end portion in the lengthwise direction of the electric wire member 20 is connected to the inverter M1 via the connector C1, and the other end portion in the lengthwise direction of the electric wire member 20 is connected to the high-voltage battery M2 via the connector C2.

Figure 2:
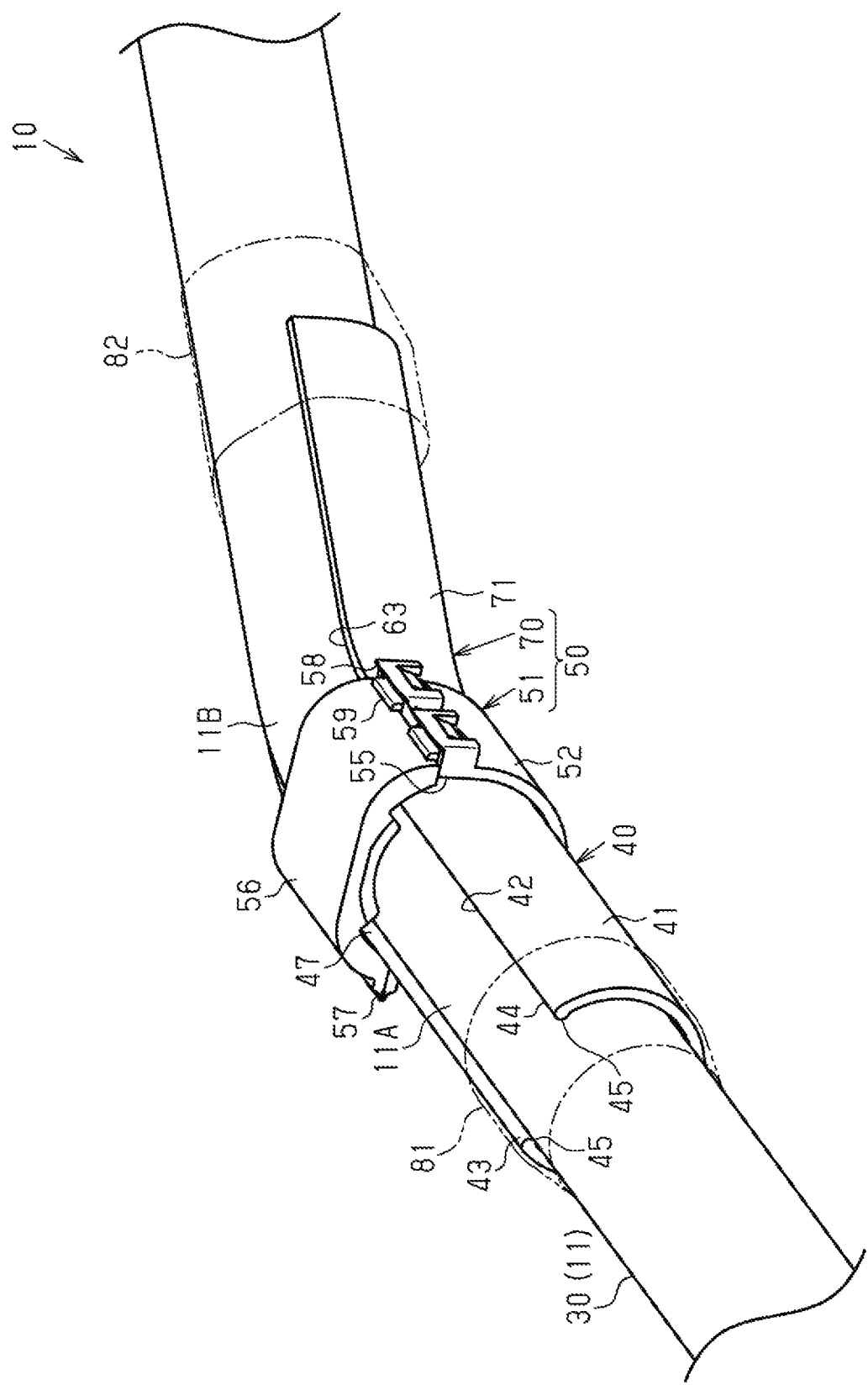
FIG. 2 is a schematic perspective view showing a wire harness of an embodiment.
Figure 3:
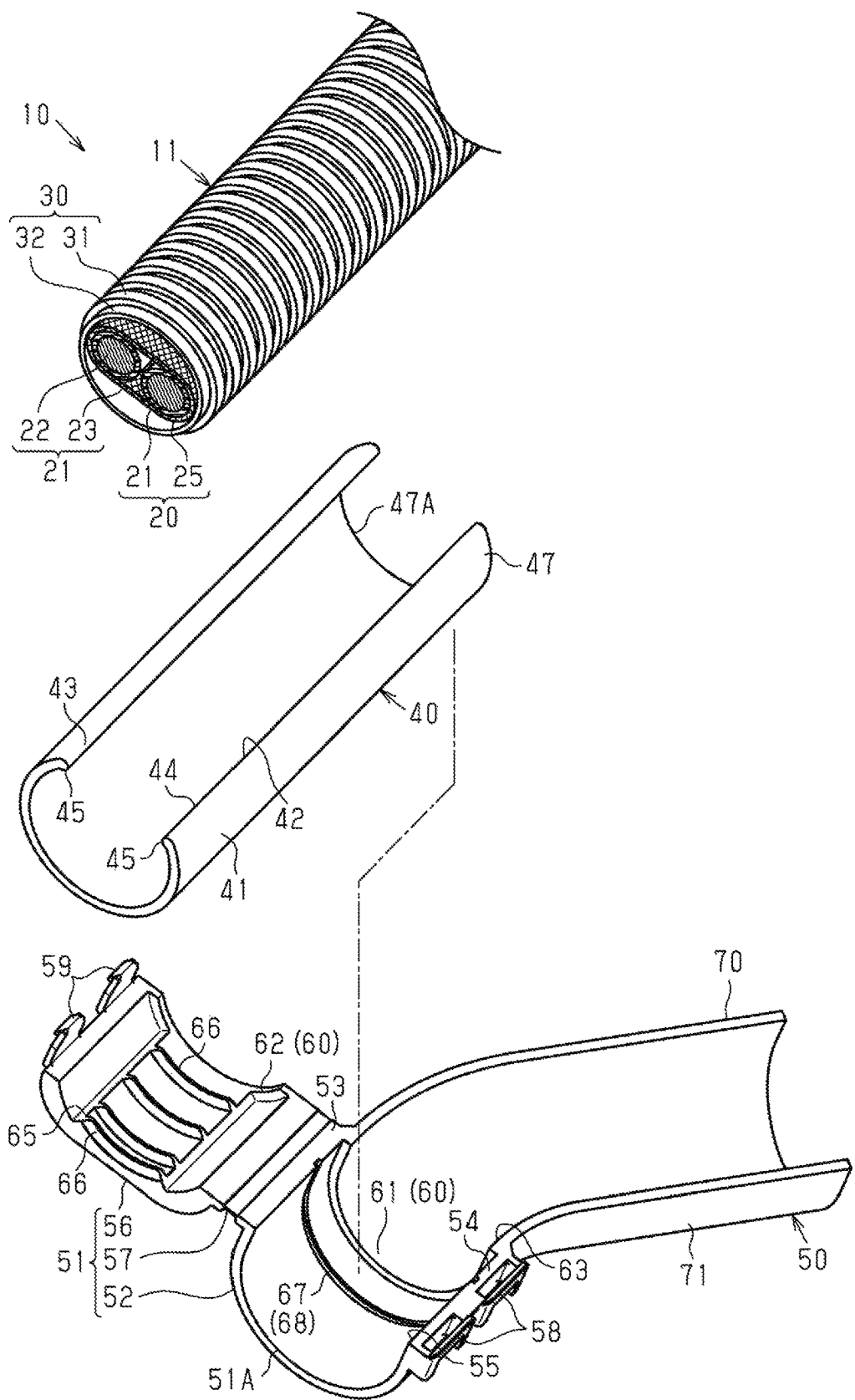
FIG. 3 is a schematic exploded perspective view showing a wire harness of an embodiment.

As shown in FIGS. 2 and 3, the wire harness 10 includes a first path restricting member 40 (first path restrictor) that is attached to the outer circumferential surface of the exterior member 30 and a second path restricting member 50 (second path restrictor) that is attached to the outer circumferential surface of the exterior member 30. The first path restricting member 40 and the second path restricting member 50 restrict the path along which the wire harness main body 11 is routed. Note that the first path restricting member 40 and the second path restricting member 50 are omitted from FIG. 1.

Configuration of Electric Wire Member 20

Figure 4:
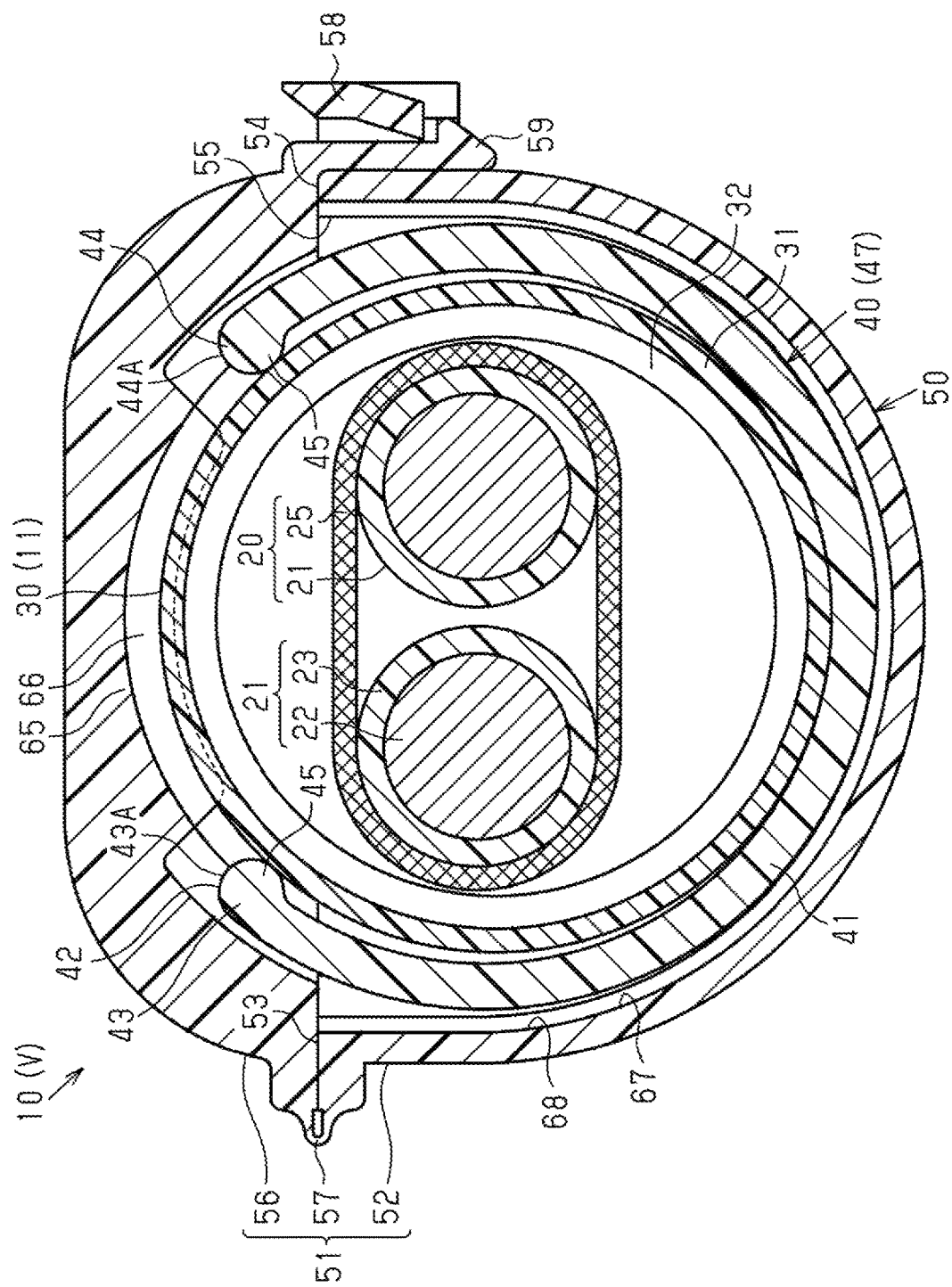
FIG. 4 is a schematic transverse cross-sectional view showing a wire harness of an embodiment.

As shown in FIGS. 3 and 4, for example, the electric wire member 20 includes one or more electric wires 21 (two in the present embodiment) and a braided member 25 that collectively encloses the outer circumferential surfaces of the plurality of electric wires 21.

As shown in FIG. 4, each electric wire 21 is a coated electric wire that includes a conductive core wire 22 and an insulating coating 23 that encloses the outer circumferential surface of the core wire 22 and has insulating properties. Each electric wire 21 is, for example, a high-voltage electric wire that withstands a high voltage and a large current. Each electric wire 21 may be, for example, a non-shielded electric wire that does not have an electromagnetic shield structure therewith, or a shielded electric wire that has an electromagnetic shield structure therewith. Each electric wire 21 in the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminum-based material may be used, for example.

The insulating coating 23 covers, for example, all the way around the outer circumferential surface of the core wire 22. The insulating coating 23 is constituted by, for example, a resin material that has insulating properties.

The cross-sectional shape of each wire 21 cut along a plane that is orthogonal to the lengthwise direction of each wire 21, that is, the transverse cross-sectional shape of each wire 21, may be any shape. The transverse cross-sectional shape of each electric wire 21 may be, for example, a circular shape, a semicircular shape, a polygonal shape, a square shape, a flat shape, or the like. The transverse cross-sectional shape of each electric wire 21 in the present embodiment is a circular shape.

The braided member 25 has, for example, a tubular shape that collectively encloses the outer circumferential surfaces of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminum-based material may be used, for example. Although not shown in the drawings, the two end portions of the braided member 25 in the lengthwise direction are grounded at, for example, the connectors C1 and C2 (see FIG. 1).

Configuration of Exterior Member 30

As shown in FIG. 3, the exterior member 30 has a tubular shape that encloses all the way around the outer circumferential surface of the electric wire member 20. The exterior member 30 in the present embodiment is formed in a cylindrical shape. The exterior member 30 is, for example, provided with a circumferential wall that is formed so as to be continuous all the way around the circumferential surface of the exterior member 30. The exterior member 30 is, for example, sealed all the way around the circumferential surface of the exterior member 30. The exterior member 30 has, for example, a function of protecting the electric wire member 20 from flying objects and water droplets.

The exterior member 30 has, for example, flexibility and is easily bendable. Examples of the flexible exterior member 30 include a resin corrugated tube and a rubber waterproof cover. The exterior member 30 of the present embodiment is a resin corrugated tube having an accordion structure in which ring-shaped protrusions 31 and ring-shaped recesses 32 are provided alternatingly and continuously along the lengthwise direction of the exterior member 30. Each of the ring-shaped protrusions 31 and the ring-shaped recesses 32 has, for example, a ring shape that encircles the exterior member 30 in the circumferential direction. As the material of the exterior member 30, for example, a synthetic resin such as polyolefin, polyamide, polyester, or ABS resin can be used. Note that in FIGS. 1 and 2, the exterior member 30 is shown simplified.

Configuration of First Path Restricting Member 40 and Second Path Restricting Member 50

As shown in FIG. 2, each of the first path restricting member 40 and the second path restricting member 50 holds the exterior member 30. Each of the first path restricting member 40 and the second path restricting member 50 is harder than, for example, the exterior member 30. Each of the first path restricting member 40 and the second path restricting member 50 has a hardness that makes it more difficult to bend in a direction orthogonal to the lengthwise direction of the wire harness main body 11 compared to the exterior member 30. As a result, each of the first path restricting member 40 and the second path restricting member 50 restricts the path of the wire harness main body 11. For example, each of the first path restricting member 40 and the second path restricting member 50 assists the exterior member 30 so that the wire harness main body 11 does not deviate from the desired path by bending due to its own weight or the like. The exterior member 30 is more difficult to bend than, for example, in a state where the first path restricting member 40 and the second path restricting member 50 are not attached.

The first path restricting member 40 is partially provided along the lengthwise direction of the wire harness main body 11. For example, the first path restricting member 40 is attached to the outer circumferential surface of the exterior member 30 along a straight section 11A, which is a straight section of the path of the wire harness main body 11. The first path restricting member 40 restricts the path of the wire harness main body 11 in the straight section 11A. Here, the straight section 11A is a section in which the path of the wire harness main body 11 extends straight in one direction. Note that one or more first path restricting members 40 are provided depending on the path of the wire harness main body 11.

The second path restricting member 50 is provided along a portion in the lengthwise direction of the wire harness main body 11. For example, the second path restricting member 50 is attached to the outer circumferential surface of the exterior member 30 along a bent section 11B, which is a bent section of the path of the wire harness main body 11. The second path restricting member 50 restricts the path of the wire harness main body 11 in the bent section 11B. Here, the bent section 11B is a section in which the path of the wire harness main body 11 is bent two-dimensionally or three-dimensionally. Note that one or more second path restricting members 50 may be provided depending on the path of the wire harness main body 11.

Configuration of First Path Restricting Member 40

As shown in FIG. 4, the first path restricting member 40 covers part of the outer circumferential surface of the exterior member 30 in the circumferential direction of the exterior member 30. The first path restricting member 40 has a tubular shape that covers the outer circumferential surface of the exterior member 30 in a portion in the circumferential direction of the exterior member 30. The transverse cross-sectional shape of the first path restricting member 40 is C-shaped overall. The first path restricting member 40 covers, for example, a range larger than half of the outer circumferential surface of the exterior member 30. The transverse cross-sectional shape of the first path restricting member 40 is, for example, uniform over the entire length in the lengthwise direction of the first path restricting member 40. As shown in FIG. 2, the first path restricting member 40 extends along the path of the straight section 11A, and is formed in a shape extending linearly in one direction, for example.

The first path restricting member 40 is made of metal or resin, for example. The first path restricting member 40 of this embodiment is made of resin. Synthetic resins such as polypropylene, polyamide, and polyacetal can be used as the material of the first path restricting member 40, for example. The first path restricting member 40 can be manufactured through a known manufacturing method such as extrusion molding or injection molding.

As shown in FIG. 3, the first path restricting member 40 has a first main body portion 41 (first main body) that covers part of the outer circumferential surface of the exterior member 30, and an insertion port 42 that opens in a direction orthogonal to the lengthwise direction of the first main body portion 41. The first path restricting member 40 has a first end portion 43 and a second end portion 44 which are both ends in the circumferential direction of the first main body portion 41 and form an insertion port 42.

As shown in FIG. 4, the first main body portion 41 forms the main part of the first path restricting member 40. The thickness in the radial direction of the first main body portion 41 is, for example, uniform in the circumferential direction of the first path restricting member 40. The transverse cross-sectional shape of the first main body portion 41 is formed, for example, in a shape that extends along the outer surface of the exterior member 30. The transverse cross-sectional shape of the first main body portion 41 is formed, for example, in an arc shape.

The first end portion 43 and the second end portion 44 are provided on mutually opposite sides in the circumferential direction of the first main body portion 41. The first end portion 43 and the second end portion 44 are provided spaced apart from each other with the insertion port 42 interposed therebetween in the circumferential direction of the first main body portion 41. In other words, the gap between the first end portion 43 and the second end portion 44 in the circumferential direction of the first path restricting member 40 is formed as the insertion port 42. As described above, the first path restricting member 40 is formed in a C shape having the insertion port 42 in a portion in the circumferential direction of the first main body portion 41.

The opening width of the insertion port 42, that is, the shortest distance between the first end portion 43 and the second end portion 44 is smaller than, for example, the outer diameter of the exterior member 30. As shown in FIG. 3, the insertion port 42 extends along the lengthwise direction of the first main body portion 41 over the entire length in the lengthwise direction of the first main body portion 41. That is, the insertion port 42 is formed so as to be open in a direction orthogonal to the lengthwise direction of the first main body portion 41 and to be open at both ends in the lengthwise direction of the first main body portion 41.

By inserting the exterior member 30 into the insertion port 42 from a direction orthogonal to the lengthwise direction of the first path restricting member 40, the first path restricting member 40 is elastically deformed and the opening width of the insertion port 42 is increased. When the exterior member 30 is inserted into the first path restricting member 40, the first path restricting member 40 elastically returns to its original shape. As a result, the opening width of the insertion port 42 is smaller than the outer diameter of the exterior member 30, and therefore the first path restricting member 40 is attached to the outer circumferential surface of the exterior member 30.

As shown in FIG. 4, the first end portion 43 has a leading end 43A. The second end portion 44 has a leading end 44A. The leading ends 43A and 44A form an insertion port 42. The leading ends 43A and 44A are curved in a view from the lengthwise direction of the first path restricting member 40. That is, the transverse cross-sectional shapes of the leading ends 43A and 44A are curved.

The first path restricting member 40 has, for example, protruding portions 45 that protrude from the inner surfaces of the first end portion 43 and the second end portion 44, respectively. Each protruding portion 45 protrudes toward the exterior member 30 inserted in the first path restricting member 40 and can come into contact with the outer surface of the exterior member 30. Each protruding portion 45 is in contact with the outer surface of the ring-shaped protrusion 31 of the exterior member 30, for example. The two protruding portions 45, for example, protrude from the inner surfaces of the leading ends 43A and 44A. The transverse cross-sectional shape of each projecting portion 45 is, for example, curved. The cross-sectional shape of each protruding portion 45 of this embodiment is formed in a semicircular shape. Each protruding portion 45 extends over the entire length in the lengthwise direction of the first path restricting member 40 along the lengthwise direction of the first path restricting member 40, for example.

Each protruding portion 45 presses the exterior member 30 from the outside of the exterior member 30, for example. The exterior member 30 is elastically sandwiched by the two protruding portions 45 and the first main body portion 41. As a result, the connection of the first path restricting member 40 to the exterior member 30 is strengthened. Accordingly, the first path restricting member 40 attached to the outer circumferential surface of the exterior member 30 is suppressed from moving in the lengthwise direction of the exterior member 30.

As shown in FIG. 3, the first path restricting member 40 has a connection portion 47 (connection) that is connected to the second path restricting member 50. The connection portion 47 is provided, for example, at an end portion in the lengthwise direction of the first path restricting member 40. The connection portion 47 has a first end surface 47A in the lengthwise direction of the first path restricting member 40.

Configuration of Second Path Restricting Member 50

As shown in FIG. 2, the second path restricting member 50 is attached to the outer circumferential surface of the exterior member 30 at the bent section 11B. The second path restricting member 50 is bent along the shape of the bent section 11B. The second path restricting member 50 is made of metal or resin, for example. The second path restricting member 50 of this embodiment is made of resin. As the material of the second path restricting member 50, for example, synthetic resin such as polypropylene, polyamide, and polyacetal can be used. The second path restricting member 50 can be manufactured, for example, through a known manufacturing method such as injection molding.

The second path restricting member 50 has a covering portion 51 (cover) that covers a portion in the lengthwise direction of the first path restricting member 40, and a path restricting portion 70 that is attached to the outer circumferential surface of the exterior member 30. The second path restricting member 50 is, for example, a single component in which the covering portion 51 and the path restricting portion 70 are formed in one piece. The covering portion 51 is provided, for example, at one end portion in the lengthwise direction of the second path restricting member 50. The covering portion 51 has a second main body portion 52 (second main body) and a lid portion 56 (lid) coupled to the second main body portion 52. The path restricting portion 70 has a third main body portion 71 (third main body). The third main body portion 71 is formed in one piece continuously with the second main body portion 52.

Configuration of Covering Portion 51

As shown in FIG. 2, the covering portion 51 is provided, for example, so as to overlap with the connecting portion 47 in the radial direction of the exterior member 30. That is, in the wire harness 10, one end portion in the lengthwise direction of the first path restricting member 40 and one end portion in the lengthwise direction of the second path restricting member 50 are provided so as to overlap with each other in the lengthwise direction of the wire harness main body 11.

The covering portion 51 encloses, for example, the outer circumferential surface of the connecting portion 47 of the first path restricting member 40. The covering portion 51 is formed, for example, in a ring shape that encloses, in the circumferential direction, the entirety of the outer circumferential surface of the connecting portion 47 and the entirety of the outer circumferential surface of the exterior member 30 at the portion to which the connecting portion 47 is attached. The covering portion 51 extends, for example, along the path of the straight section 11A, and is formed in a shape extending linearly in one direction.

As shown in FIG. 4, the second main body portion 52 covers, for example, a portion of the outer circumferential surface of the exterior member 30 in the circumferential direction of the exterior member 30. The second main body portion 52 covers, for example, a portion of the outer circumferential surface of the first path restricting member 40 in the circumferential direction of the first path restricting member 40. The second main body portion 52 has a tubular shape that covers the outer circumferential surface of the first path restricting member 40 at a portion in the circumferential direction of the first path restricting member 40. The second main body portion 52 covers the outer circumferential surface of the first main body portion 41 of the first path restricting member 40, for example. The second main body portion 52 covers, for example, a range larger than half of the outer circumferential surface of the first main body portion 41. The transverse cross-sectional shape of the inner surface of the second main body portion 52 is formed in a shape corresponding to the outer surface of the first main body portion 41, for example. The transverse cross-sectional shape of the inner surface of the second main body portion 52 is, for example, curved. The transverse cross-sectional shape of the inner surface of the second main body portion 52 is U-shaped overall.

As shown in FIG. 3, the second main body portion 52 has a second end surface 51A in the lengthwise direction of the covering portion 51. The second end surface 51A is an end surface in the lengthwise direction of the second path restricting member 50 and is an end surface of the covering portion 51. The second end surface 51A is provided at the end portion on the side opposite to the end portion connected to the path restricting portion 70 out of the two end portions in the lengthwise direction of the covering portion 51. The second main body portion 52 has a third end surface 53 and a fourth end surface 54, which are the two end surfaces in the circumferential direction of the second main body portion 52. The second main body portion 52 has a first accommodation port 55 formed by the third end surface 53 and the fourth end surface 54. The first accommodation port 55 is an opening between the third end surface 53 and the fourth end surface 54. The first accommodation port 55 is open in a direction orthogonal to the lengthwise direction of the second main body portion 52. The first accommodation port 55 extends over the entire length in the lengthwise direction of the second main body portion 52, along the lengthwise direction of the second main body portion 52. The opening width of the first accommodation port 55, that is, the shortest distance between the third end surface 53 and the fourth end surface 54, is, for example, equal to the outer diameter of the first path restricting member 40 or larger than the outer diameter of the first path restricting member 40. The exterior member 30 and the first path restricting member 40 are inserted into the first accommodation port 55 along a direction orthogonal to the lengthwise direction of the second path restricting member 50.

The lid portion 56 is formed in one piece with the second main body portion 52, for example. The transverse cross-sectional shape of the inner surface of the lid portion 56 is formed in a shape corresponding to the outer surface of the exterior member 30, for example. The transverse cross-sectional shape of the inner surface of the lid portion 56 is formed in a shape corresponding to the outer surface of the first path restricting member 40, for example. The transverse cross-sectional shape of the inner surface of the lid portion 56 is, for example, an elliptical arc or an elongated circular arc. The lid portion 56 is formed in, for example, a substantially semi-elliptical cylindrical shape. Here, an "elongated circle" in this specification is a shape composed of two parallel lines of equal length and two semicircles.

The lid portion 56 covers the first accommodation port 55 of the second main body portion 52. The lid portion 56 covers the first accommodation port 55 in only the covering portion 51 in the lengthwise direction of the second path restricting member 50, for example. In other words, the lid portion 56 is provided on only the covering portion 51 of the second path restricting member 50, and is not provided on the path restricting portion 70.

The covering portion 51 has, for example, a hinge portion 57 that connects the second main body portion 52 and the lid portion 56. The hinge portion 57 connects one end in the circumferential direction of the second main body portion 52 and one end in the circumferential direction of the lid portion 56. One or more (two in this embodiment) lock portions 58 are provided at the other end in the circumferential direction of the second main body portion 52. One or more (two in this embodiment) claw portions 59 are provided at the other end in the circumferential direction of the lid portion 56.

The second main body portion 52 and the lid portion 56 are pivotable relative to each other about the hinge portion 57. The lid portion 56 is pivotable about the hinge portion 57 between an open position shown in FIG. 3 and a closed position shown in FIG. 2. As shown in FIG. 4, the claw portion 59 catches on the lock portion 58 when the lid portion 56 is in the closed position. As a result, the lid portion 56 is held in the closed position. In this manner, the second main body portion 52 and the lid portion 56 are coupled to each other. In a state in which the second main body portion 52 and the lid portion 56 are coupled to each other, the covering portion 51 has a ring shape that surrounds the exterior member 30 and the outer circumferential surface of the connection portion 47 together. The lid portion 56 covers the first accommodation port 55 of the second main body portion 52 in the closed position. For example, the lid portion 56 covers the insertion port 42 at the connection portion 47 in the closed position.

As shown in FIG. 3, the covering portion 51 has, for example, a restricting wall 60 that can engage with the first end surface 47A in the lengthwise direction of the first path restriction member 40 in the lengthwise direction of the wire harness main body 11. The restricting wall 60 protrudes inward in the radial direction of the covering portion 51 from the inner surface of the covering portion 51, for example. The restricting wall 60 extends along the circumferential direction of the covering portion 51, for example. The restricting wall 60 extends, for example, over the entire circumferential surface in the circumferential direction of the covering portion 51. The restricting wall 60 is provided at one end portion in the lengthwise direction of the covering portion 51.

The restricting wall 60 has, for example, a body-side restricting wall 61 formed on the inner surface of the second main body portion 52 and a lid-side restricting wall 62 formed on the inner surface of the lid portion 56. The body-side restricting wall 61 and the lid-side restricting wall 62 are provided at the same positions as each other in the lengthwise direction of the wire harness main body 11, for example.

Figure 5:
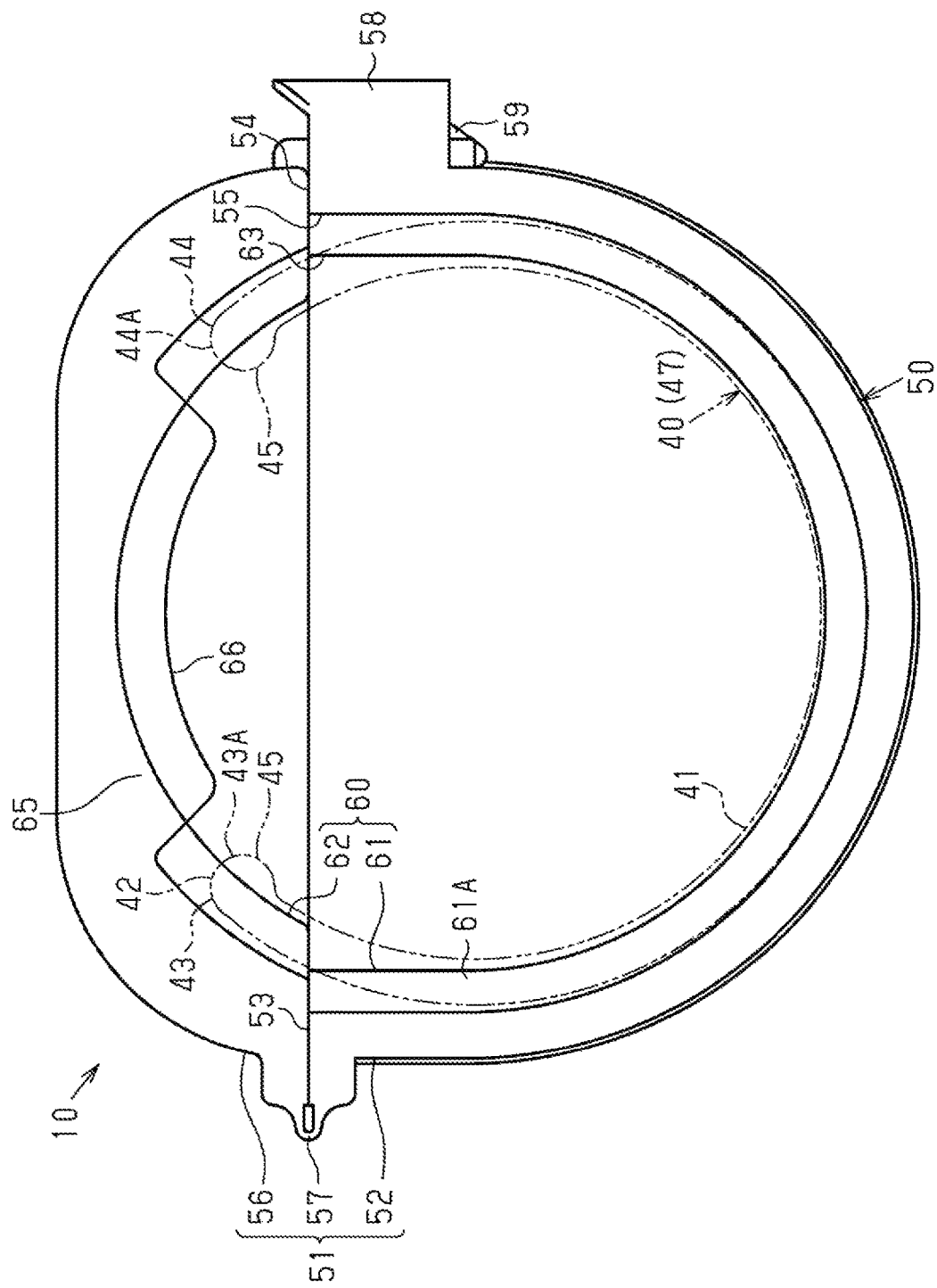
FIG. 5 is a schematic front view showing a wire harness of an embodiment.

As shown in FIG. 5, the body-side restricting wall 61 protrudes inward in the radial direction from the inner surface of the second main body portion 52. The body-side restricting wall 61 extends over the entire circumferential surface of the second main body portion 52 in the circumferential direction of the covering portion 51, for example. The transverse cross-sectional shape of the inner surface of the body-side restricting wall 61 is formed in the same shape as the transverse cross-sectional shape of the inner surface of the second main body portion 52. The transverse cross-sectional shape of the inner surface of the body-side restricting wall 61 of this embodiment is formed in a U shape. The transverse cross-sectional shape of the inner surface of the body-side restricting wall 61 is, for example, one size smaller than the transverse cross-sectional shape of the inner surface of the second main body portion 52.

The body-side restricting wall 61 has a second accommodation port 63 that is open in a direction orthogonal to the lengthwise direction of the second main body portion 52. The second accommodation port 63 is in communication with the first accommodation port 55. The opening width of the second accommodation port 63 is smaller than the opening width of the first accommodation port 55. The opening width of the second accommodation port 63 is smaller than the outer diameter of the first path restricting member 40, for example.

As shown in FIG. 3, the body-side restricting wall 61 is provided, for example, at the end portion connected to the third main body portion 71 among the two end portions in the lengthwise direction of the second main body portion 52. The body-side restricting wall 61 extends along the lengthwise direction of the wire harness main body 11, for example. The body-side restricting wall 61 extends, for example, from the end portion of the second main body portion 52 over the entire length in the lengthwise direction of the third main body portion 71. For example, at the boundary between the inner surface of the second main body portion 52 and the inner surface of the third main body portion 71, a level difference is formed by the body-side restricting wall 61.

Figure 6:
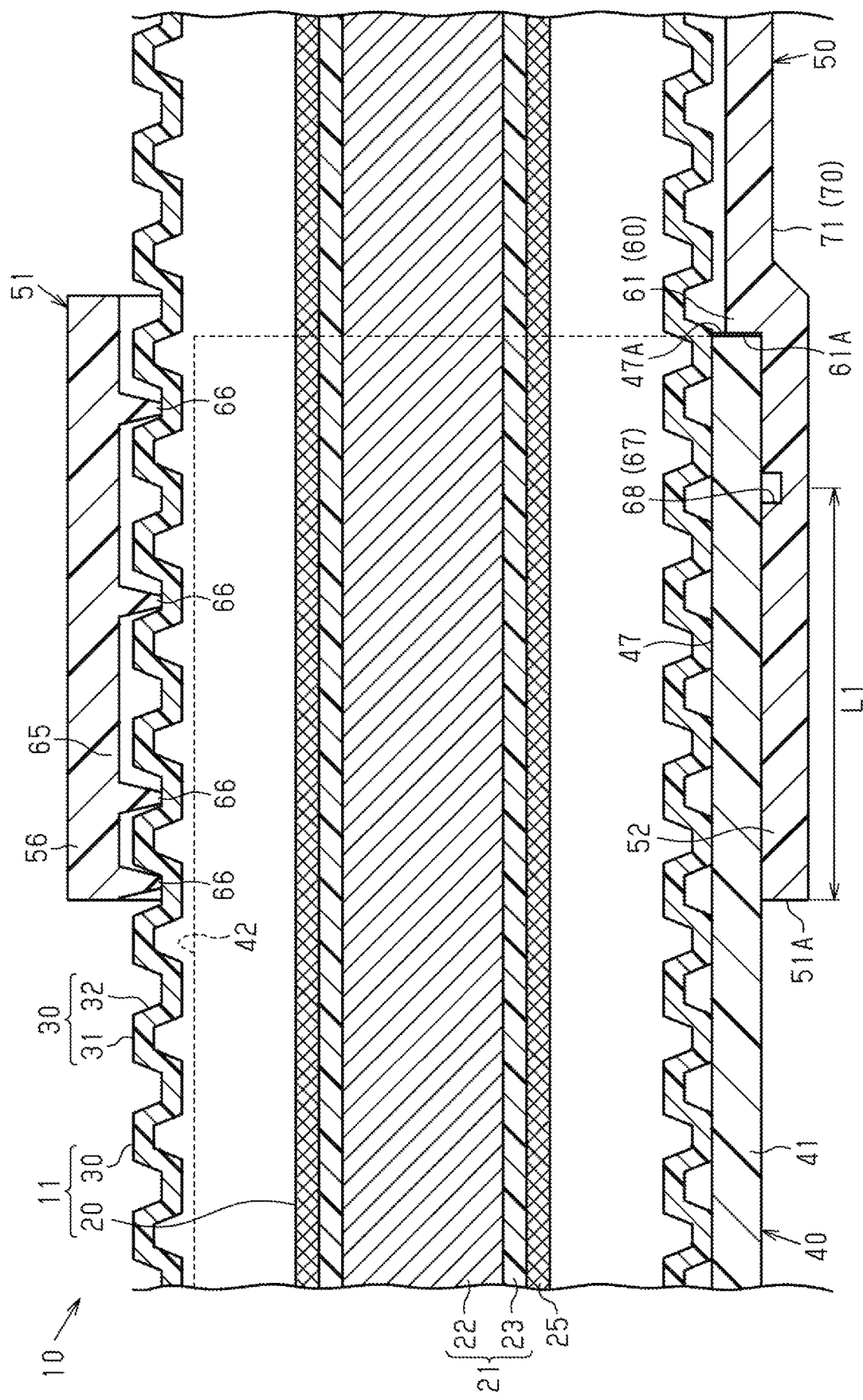
FIG. 6 is a schematic cross-sectional view showing a wire harness of an embodiment.

As shown in FIG. 6, the end surface 61A in the lengthwise direction of the body-side restricting wall 61 opposes the first main body portion 41 of the first path restricting member 40 in the lengthwise direction of the wire harness main body 11, for example, and can come into contact with the first main body portion 41. The end surface 61A of the body-side restricting wall 61 opposes the first end surface 47A in the lengthwise direction of the first path regulation member 40 in the lengthwise direction of the wire harness main body 11, for example, and can come into contact with the first end surface 47A.

As shown in FIG. 5, the lid-side restricting wall 62 protrudes inward in the radial direction from the inner surface of the lid portion 56. The lid-side restricting wall 62 extends over the entire circumferential surface of the lid portion 56 in the circumferential direction of the covering portion 51, for example. The transverse cross-sectional shape of the inner surface of the lid-side restricting wall 62 is formed in a shape corresponding to the outer surface of the first path restricting member 40, for example. The transverse cross-sectional shape of the inner surface of the lid-side restricting wall 62 is formed, for example, in an arc shape or an elliptical arc shape. The transverse cross-sectional shape of the inner surface of the lid-side restricting wall 62 of this embodiment is formed in a semi-elliptical arc shape.

The lid-side restricting wall 62 opposes the first end portion 43 and the second end portion 44 of the first path restricting member 40 in the lengthwise direction of the wire harness main body 11 (see FIG. 3), for example, and can come into contact with the first end portion 43 and the second end portion 44.

As shown in FIG. 3, the restricting wall 60 composed of the body-side restricting wall 61 and the lid-side restricting wall 62 restricts movement of the first path restricting member 40 in the lengthwise direction of the wire harness main body 11 by coming into contact with the first end surface 47A in the lengthwise direction of the first path restricting member 40. For example, the restricting wall 60 restricts movement of the first path restricting member 40 so that the first path restricting member 40 is not inserted into the path restricting portion 70. Such a restricting wall 60 functions as a second mark indicating a maximum insertion amount of the first path restriction member 40 into the covering portion 51 in the lengthwise direction of the wire harness main body 11. That is, the restricting wall 60 functions as a mark indicating the maximum insertion amount by which the first path restricting member 40 can be allowed to be inserted into the covering portion 51, that is, the maximum overlapping width between the connection portion 47 and the covering portion 51 in the lengthwise direction of the wire harness main body 11. In other words, the restricting wall 60 functions as a mark indicating the limit position to which the first path restricting member 40 can be allowed to be inserted into the covering portion 51 in the lengthwise direction of the wire harness main body 11.

As shown in FIG. 4, the covering portion 51 has, for example, a projecting portion 65. The projecting portion 65 protrudes from the inner surface of the covering portion 51 toward the insertion port 42 of the first path restricting member 40 inserted in the covering portion 51. The projecting portion 65 protrudes so as to be arranged inside the insertion port 42. The projecting portion 65 can come into contact with the first end portion 43 and the second end portion 44 in the circumferential direction of the first path restricting member 40. Due to the projecting portion 65 and the first end portion 43 or the second end portion 44 being engaged with each other, relative movement of the first path restricting member 40 with respect to the covering portion 51 in the circumferential direction of the first path restricting member 40 is suppressed. For this reason, it is possible to suppress misalignment of the first path restricting member 40 with respect to the covering portion 51 in the circumferential direction of the first path restricting member 40.

The projecting portion 65 is provided on the inner surface of the lid portion 56, for example. The projecting portion 65 protrudes from the inner surface of the lid portion 56 toward the first accommodation port 55, for example. For this reason, when the projecting portion 65 is arranged inside the insertion port 42, the insertion port 42 faces the lid portion 56 side of the covering portion 51.

As shown in FIG. 3, the projecting portion 65 extends along the lengthwise direction of the wire harness main body 11, for example. The projecting portion 65 extends over the entire length in the lengthwise direction of the covering portion 51, along the lengthwise direction of the covering portion 51, for example. The projecting portion 65 is partially provided in the circumferential direction of the lid portion 56, for example. The projecting portion 65 is provided, for example, at an intermediate portion in the circumferential direction of the lid portion 56. A portion of the projecting portion 65 constitutes, for example, the lid-side restricting wall 62. For example, the projecting portion 65 provided at one end portion in the lengthwise direction of the covering portion 51 constitutes the lid-side restricting wall 62.

As shown in FIG. 6, the projecting portion 65 has, for example, a protrusion 66 that fits into a ring-shaped recess 32 of the exterior member 30. The protrusion 66 is provided so as to further protrude from the projecting leading end surface of the projecting portion 65. A plurality of protrusions 66 are provided in the lengthwise direction of the wire harness main body 11. In this embodiment, four protrusions 66 are provided in the lengthwise direction of the wire harness main body 11, and each of the protrusions 66 is inserted into a different ring-shaped recess 32. Due to the protrusions 66 entering the ring-shaped recesses 32, movement of the exterior member 30 relative to the second path restricting member 50 in the lengthwise direction of the exterior member 30 can be suppressed.

As shown in FIG. 3, the covering portion 51 has the mark 67 indicating the necessary minimum insertion amount of the first path restricting member 40 into the covering portion 51 in the lengthwise direction of the wire harness main body 11. The mark 67 is provided on the inner surface of the second main body portion 52, for example.

As shown in FIG. 6, the mark 67 has, for example, a recess 68 provided on the inner surface of the second main body portion 52. The recess 68 is formed so as to be recessed from the inner surface of the second main body portion 52 toward the outside in the radial direction of the covering portion 51. The recess 68 is, for example, a recess that does not pass through the second main body portion 52 in the radial direction of the covering portion 51. The recess 68 is partially provided in the lengthwise direction of the covering portion 51. The recess 68 is provided, for example, in the intermediate portion in the lengthwise direction of the covering portion 51. The recess 68 is provided spaced apart by, for example, a first distance L1 from the second end surface 51A in the lengthwise direction of the covering portion 51 in the lengthwise direction of the wire harness main body 11. Here, the second end surface 51A is provided at the end portion on the side opposite to the restricting wall 60 out of the two end portions in the lengthwise direction of the covering portion 51. Also, the first distance L1 is set, for example, to a distance corresponding to the needed minimum insertion amount of the first path restricting member 40 into the covering portion 51 in the lengthwise direction of the wire harness main body 11. The minimum insertion amount of the first path restricting member 40 is, for example, an insertion amount that is needed to make it difficult for the first path restricting member 40 to detach from the covering portion 51, that is, the overlapping width between the connection portion 47 and the covering portion 51 in the lengthwise direction of the wire harness main body 11. The minimum insertion amount of the first path restricting member 40 is set, for example, according to the ease of movement of the first path restricting member 40 with respect to the covering portion 51 in the lengthwise direction of the wire harness main body 11. For example, if the first path restricting member 40 is freely movable with respect to the covering portion 51 in the lengthwise direction of the wire harness main body 11, the minimum insertion amount of the first path restricting member 40 is set to be large. The recess 68 of the present embodiment is provided at a position closer to the restricting wall 60 out of the second end surface 51A and the restricting wall 60, in the lengthwise direction of the covering portion 51. That is, the recess 68 of the present embodiment is provided so as to be biased toward the restricting wall 60 in the lengthwise direction of the covering portion 51. The recess 68 of this embodiment is provided spaced apart from the restricting wall 60 in the lengthwise direction of the covering portion 51.

As shown in FIGS. 3 and 4, the recess 68 extends along the circumferential direction of the covering portion 51, for example. The recess 68 extends over the entire circumferential surface of the second main body portion 52 in the circumferential direction of the covering portion 51, for example.

Structure of Path Restricting Portion 70

As shown in FIG. 2, the third main body portion 71 of the path restricting portion 70 extends, for example, along the path of the bent section 11B. That is, the third main body portion 71 has a bent shape extending along the shape of the bent section 11B. The third main body portion 71 covers, for example, a portion of the outer circumferential surface of the exterior member 30 in the circumferential direction of the exterior member 30. The third main body portion 71 has a tubular shape that covers the outer circumferential surface of the exterior member 30 at a portion in the circumferential direction of the exterior member 30. The third main body portion 71 covers, for example, a range larger than half of the outer circumferential surface of the exterior member 30. The transverse cross-sectional shape of the inner surface of the third main body portion 71 is formed in a shape corresponding to the outer surface of the exterior member 30. The transverse cross-sectional shape of the inner surface of the third main body portion 71 is, for example, curved. The transverse cross-sectional shape of the inner surface of the third main body portion 71 is U-shaped overall.

The third main body portion 71 has a second accommodation port 63 that is open in a direction orthogonal to the lengthwise direction of the third main body portion 71. The second accommodation port 63 extends over the entire length in the lengthwise direction of the third main body portion 71, along the lengthwise direction of the third main body portion 71. The second accommodation port 63 is in communication with the first accommodation port 55. The accommodation port constituted by the first accommodation port 55 and the second accommodation port 63 extends over the entire length in the lengthwise direction of the second path restricting member 50, along the lengthwise direction of the second path restricting member 50. That is, the accommodation port constituted by the first accommodation port 55 and the second accommodation port 63 is open in a direction orthogonal to the lengthwise direction of the second path restricting member 50 and is open at both ends in the lengthwise direction of the second path restricting member 50.

The opening width of the second accommodation port 63 is equal to the outer diameter of the exterior member 30 or larger than the outer diameter of the exterior member 30, for example. The exterior member 30 is inserted into the second accommodation port 63 along a direction orthogonal to the lengthwise direction of the second path restricting member 50. Note that the first path restricting member 40 is not inserted in the third main body portion 71.

Configuration of Fixing Members 81 and 82

The wire harness 10 has, for example, a fixing member 81 that fixes the first path restricting member 40 to the outer circumferential surface of the exterior member 30. The wire harness 10 has, for example, a fixing member 82 that fixes the second path restricting member 50 to the outer circumferential surface of the exterior member 30. As the fixing members 81 and 82, for example, a cable tie made of resin or metal, a crimping ring, adhesive tape, or the like can be used. The fixing members 81 and 82 of this embodiment are adhesive tape.

The fixing member 81 is formed, for example, so as to fix the end portion provided on the side opposite to the connecting portion 47 out of the end portions in the lengthwise direction of the first path restricting member 40 to the outer surface of the exterior member 30. The fixing member 81 is wound, for example, from the outer surface of the end portion in the lengthwise direction of the first path restricting member 40 to the outer surface of the exterior member 30. Accordingly, it is possible to suppress movement of the first path restricting member 40 with respect to the exterior member 30 in the lengthwise direction and the circumferential direction of the wire harness body 11. The fixing member 82 is formed, for example, so as to fix the end portion provided on the side opposite to the covering portion 51 among the end portions in the lengthwise direction of the second path restricting member 50 to the outer surface of the exterior member 30. The fixing member 82 is wound, for example, from the outer surface of the end portion in the lengthwise direction of the second path restricting member 50 to the outer surface of the exterior member 30. This makes it possible to suppress movement of the second path restricting member 50 with respect to the exterior member 30 in the lengthwise direction and the circumferential direction of the wire harness body 11.

Next, actions of this embodiment will be described.

The connection portion 47 of the first path restricting member 40 and the covering portion 51 of the second path restricting member 50 are provided so as to overlap each other in the lengthwise direction of the wire harness main body 11. At this time, the covering portion 51 covering the outer circumferential surface of the connection portion 47 is provided with a mark 67 indicating the necessary minimum insertion amount of the first path restricting member 40 into the covering portion 51. According to this configuration, during the task of inserting the first path restricting member 40 into the covering portion 51, the position corresponding to the minimum insertion amount of the first path restricting member 40 in the covering portion 51 can be easily confirmed based on the mark 67. That is, based on the mark 67, it is possible to easily confirm how far the first path restricting member 40 needs to be inserted into the covering portion 51. Here, when inserting the first path restricting member 40 into the covering portion 51, for example, the first path restricting member 40 is inserted into the covering portion 51 such that the first end surface 47A of the first path restricting member 40 exceeds the mark 67 while the mark 67 is visually confirmed. That is, while the mark 67 is visually confirmed, the first path restricting member 40 is inserted into the covering portion 51 such that the first end surface 47A is inserted farther than the mark 67 in the lengthwise direction of the wire harness main body 11, that is, to a position close to the restricting wall 60 relative to the mark 67. In other words, the first path restricting member 40 is inserted into the covering portion 51 such that the first path restricting member 40 hides the recess 68 that is the mark 67, that is, such that the recess 68 cannot be seen. By inserting the first path restricting member 40 into the covering portion 51 farther than the mark 67 in this manner, the first path restricting member 40 can be suitably inserted into the covering portion 51 by a necessary minimum insertion amount or more. As a result, detachment of the first path restricting member 40 from the covering portion 51 can be suitably suppressed.

Next, the effects of this embodiment will be described.

(1) The covering portion 51 covering the outer circumferential surface of the connection portion 47 is provided with the mark 67 indicating the necessary minimum insertion amount of the first path restricting member 40 into the covering portion 51. According to this configuration, during the task of inserting the first path restricting member 40 into the covering portion 51, the position corresponding to the minimum insertion amount of the first path restricting member 40 in the covering portion 51 can be easily confirmed based on the mark 67. For this reason, by inserting the first path restricting member 40 into the covering portion 51 while confirming the mark 67, the first path restricting member 40 can be suitably inserted into the covering portion 51 by a necessary minimum insertion amount or more. As a result, detachment of the first path restricting member 40 from the covering portion 51 can be suitably suppressed. As a result, the connection reliability between the first path restricting member 40 and the second path restricting member 50 can be improved.

(2) During the task of inserting the first path restricting member 40 into the covering portion 51, the first path restricting member 40 can be inserted into the covering portion 51 using the mark 67 as a guide. As a result, the efficiency of the task of inserting the first path restricting member 40 into the covering portion 51 can be improved, and therefore the assembly workability of the wire harness 10 can be improved.

(3) In this embodiment, the first path restricting member 40 is inserted into the covering portion 51 such that the mark 67 is hidden. For this reason, by confirming whether or not the mark 67 is visible after inserting the first path restricting member 40, it is possible to easily confirm whether or not the first path restricting member 40 has been inserted into the covering portion 51 by the minimum necessary insertion amount or more. That is, it is possible to easily confirm whether or not the first path restricting member 40 has been properly inserted into the covering portion 51 by using the positional relationship between the first path restricting member 40 and the mark 67 as a guide.

(4) The insertion port 42 of the first path restricting member 40 is open in a direction orthogonal to the lengthwise direction of the first path restricting member 40 and extends over the entire length in the lengthwise direction of the first path restricting member 40. As a result, it is possible to attach the first path restricting member 40 to the exterior member 30 from the insertion port 42 after performing terminal processing such as attachment of the connectors C1 and C2 to the end portions in the lengthwise direction of the electric wire members 20. In this manner, since the first path restricting member 40 can be retrofitted, the assembly workability of the wire harness 10 can be improved.

(5) The covering portion 51 is provided with a restricting wall 60 that can engage with the first end surface 47A in the lengthwise of the first path regulation member 40, in the lengthwise direction of the wire harness main body 11. When the first end surface 47A of the first path restricting member 40 is engaged with the restricting wall 60, relative movement of the first path restricting member 40 with respect to the second path restricting member 50 in the lengthwise direction of the wire harness main body 11 is suppressed. For this reason, when the first end surface 47A is engaged with the restricting wall 60, insertion of the first path restricting member 40 into the path restricting portion 70 of the second path restricting member 50 can be suppressed. In other words, the restricting wall 60 can function as a mark indicating the maximum insertion amount of the first path restricting member 40 into the covering portion 51 in the lengthwise direction of the wire harness main body 11. As a result, during the task of inserting the first path restricting member 40 into the covering portion 51, the first path restricting member 40 can be inserted into the covering portion 51 using the mark 67 and the restricting wall 60 as a guide. This makes it possible to suitably insert the first path restricting member 40 into the covering portion 51 to a desired position by inserting the first path restricting member 40 into the covering portion 51 such that the first end surface 47A is positioned between the mark 67 and the restricting wall 60. As a result, the efficiency of the task of inserting the first path restricting member 40 into the covering portion 51 can be further improved, and therefore the assembly workability of the wire harness 10 can be further improved.

(6) When attaching the first path restricting member 40 to the second path restricting member 50, the first path restricting member 40 can be easily positioned with respect to the second path restricting member 50 in the lengthwise direction of the wire harness main body 11 by engaging the first end surface 47A in the lengthwise direction of the first path restricting member 40 with the restricting wall 60.

(7) The mark 67 is provided spaced apart by the first distance L1 corresponding to the minimum insertion amount from the second end surface 51A provided on the side opposite to the restricting wall 60 in the lengthwise direction of the covering portion 51. According to this configuration, the minimum insertion amount and the maximum insertion amount of the first path restricting member 40 into the covering portion 51 can be easily confirmed based on the mark 67 and the restricting wall 60. Accordingly, the necessary insertion amount of the first path restricting member 40 into the covering portion 51 can be easily confirmed based on the mark 67 and the restricting wall 60.

(8) The covering portion 51 is formed in a ring shape that surrounds the connection portion 47 and the exterior member 30 together. The covering portion 51 has a second main body portion 52 that covers a portion of the outer circumferential surface of the first main body portion 41 and a lid portion 56 that is coupled to the second main body portion 52. According to this configuration, the covering portion 51 is formed in an annular shape surrounding the connection portion 47 and the exterior member 30, and the covering portion 51 is divided into the second main body portion 52 and the lid portion 56, and therefore the second path restricting member 50 including the covering portion 51 can be retrofitted to the first path restricting member 40 and the exterior member 30. This makes it possible to further improve the assembly workability of the wire harness 10.

(9) The mark 67 has a recess 68 provided on the inner surface of the second main body portion 52. According to this configuration, when inserting the first path restricting member 40 into the second main body portion 52, the recess 68 serving as the mark 67 is provided on the inner surface of the second main body portion 52, and therefore the position of the recess 68 is easy to visually confirm. Furthermore, the positional relationship between the recess 68 and the first end surface 47A of the first path restricting member 40 can be easily confirmed visually. As a result, the workability when inserting the first path restricting member 40 into the covering portion 51 can be improved, and the first path restricting member 40 can be suitably inserted into the covering portion 51 by the necessary minimum insertion amount or more.

(10) The recess 68 extends over the entirety of the circumferential surface of the second main body portion 52 in the circumferential direction of the covering portion 51. According to this configuration, since the recess 68 is formed in a wide range in the circumferential direction of the covering portion 51, the position of the recess 68 is easier to confirm visually.

(11) The recess 68 is a recess that does not pass through the second main body portion 52 in the radial direction of the covering portion 51. According to this configuration, the recess 68 does not pass through the second main body portion 52 in the radial direction, and therefore the recess 68 can be formed in a wide range in the circumferential direction of the covering portion 51. Also, since the recess 68 is provided on the inner surface of the second main body portion 52, it is possible to suitably suppress a case in which the recess 68 hinders the insertion of the first path restricting member 40 into the second main body portion 52.

(12) The first path restricting member 40 restricts the path of the straight section 11A, and the second path restricting member 50 restricts the path of the bent section 11B. This makes it possible to suppress a case in which the path of the straight section 11A and the path of the bent section 11B deviate from desired paths.

Other Embodiments

The above embodiment can be modified and implemented as follows. The above embodiment and the following modifications can be implemented in combination with each other as long as no contradiction arises.

In the above-described embodiment, the recess 68 was formed so as to extend continuously along the circumferential direction of the covering portion 51, but there is no limitation to this. For example, the recess 68 may be provided so as to intermittently extend along the circumferential direction of the covering portion 51. That is, the recess 68 may be partially provided at predetermined intervals in the circumferential direction of the covering portion 51.

In the above-described embodiment, the recess 68 was formed so as to extend over the entire circumferential surface of the second main body portion 52 in the circumferential direction of the covering portion 51, but there is no limitation to this. For example, the recess 68 may be formed in only a portion of the second main body portion 52 in the circumferential direction of the covering portion 51.

In the above-described embodiment, the recess 68 was formed as a recess that does not pass through the second main body portion 52 in the radial direction of the covering portion 51, but there is no limitation to this. For example, the recess 68 may be formed as a through hole passing through the second main body portion 52 in the radial direction.

In the above-described embodiment, the recess 68 was provided on only the inner surface of the second main body portion 52, but there is no limitation to this. For example, the recess 68 may be provided on the inner surface of the second main body portion 52 and on the inner surface of the lid portion 56 as well.

Although the mark 67 in the above-described embodiment had the recess 68 provided on the inner surface of the second main body portion 52, there is no limitation to this. For example, instead of the recess 68, the mark 67 may have a protrusion that protrudes inward in the radial direction of the covering portion 51 from the inner surface of the second main body portion 52. Also, the mark 67 may have a pattern formed by printing or engraving on the inner surface of the second main body portion 52 instead of the recess 68, for example.

Figure 7:
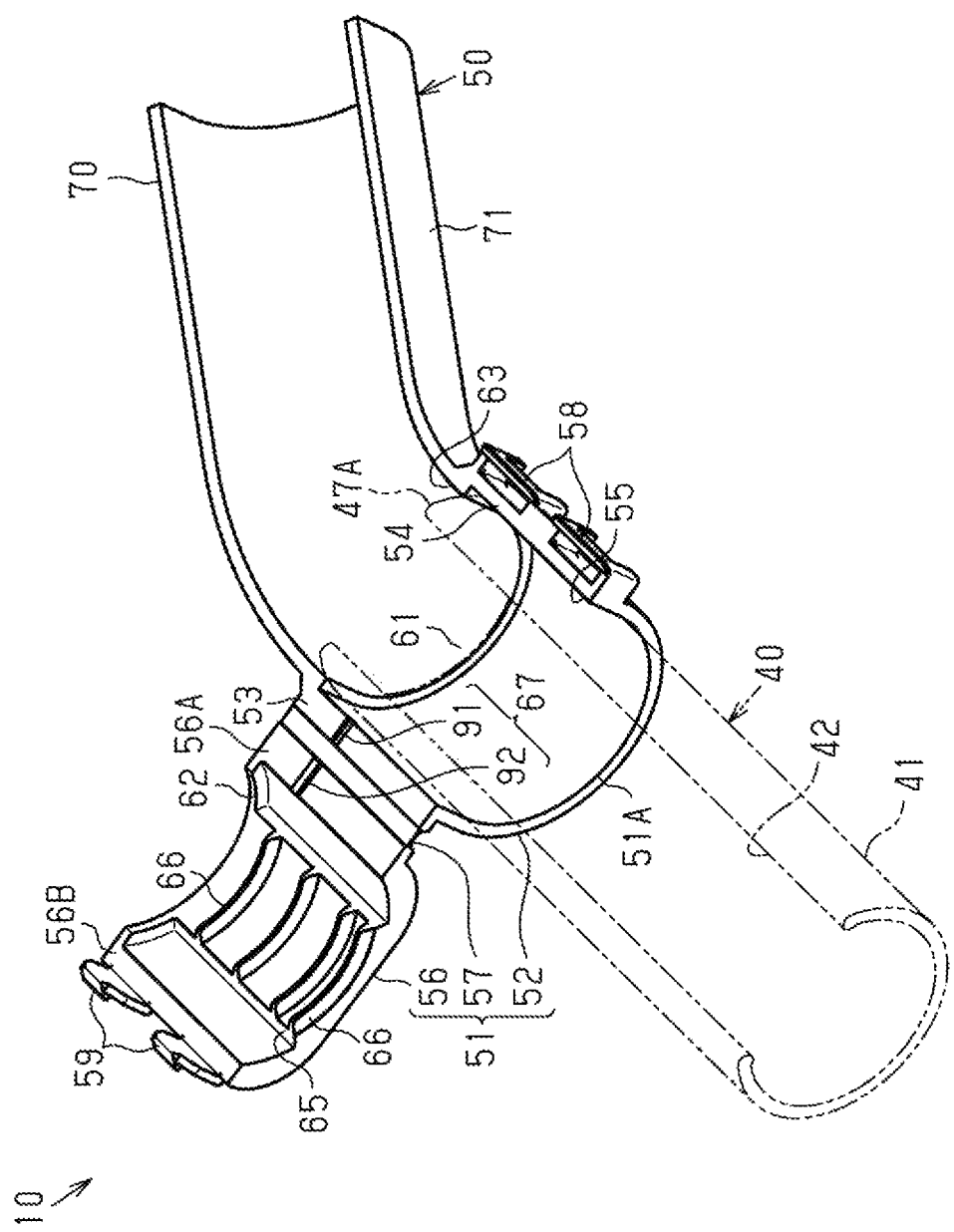
FIG. 7 is a schematic perspective view showing a wire harness of a modified example.

For example, as shown in FIG. 7, the mark 67 may also be provided on the end surface in the circumferential direction of the second main body portion 52. For example, the mark 67 may also be provided on at least one of the third end surface 53 and the fourth end surface 54 of the second main body portion 52. The mark 67 of this modified example has a groove portion 91 provided in the third end surface 53. The groove portion 91 is formed so as to be recessed from the third end surface 53. The groove portion 91 extends over the entire length of the third end surface 53 in the radial direction of the covering portion 51, for example.

According to this configuration, since the groove portion 91 serving as the mark 67 is formed in the third end surface 53, the groove portion 91 can be visually confirmed even after the first path restricting member 40 is inserted into the second main body portion 52. As a result, even after the first path restricting member 40 is inserted into the second main body portion 52, the positional relationship between the first end surface 47A (see FIG. 3) of the first path restricting member 40 and the groove portion 91 can be easily confirmed.

For example, as shown in FIG. 7, the mark 67 may have a protrusion 92 provided on the lid portion 56. Here, the lid portion 56 has a fifth end surface 56A and a sixth end surface 56B, which are both end surfaces in the circumferential direction of the lid portion 56. The fifth end surface 56A is provided at the end portion connected to the second main body portion 52 via the hinge portion 57 among the two end portions in the circumferential direction of the lid portion 56. The protrusion 92 of this modified example is formed so as to protrude from the fifth end surface 56A. The protrusion 92 is formed, for example, to have a size that allows recess-protrusion fitting in the groove portion 91. The protrusion 92 is formed so as to fit by recess-protrusion fitting in the groove 91, for example, when the lid 56 is in the closed position.

In the modified example shown in FIG. 7, the groove portion 91 may be provided in the fourth end surface 54. Also, the groove portion 91 may be provided on both the third end surface 53 and the fourth end surface 54.

In the modified example shown in FIG. 7, the protrusion 92 may also be provided on the sixth end surface 56B. Also, the protrusion 92 may be provided on both the fifth end surface 56A and the sixth end surface 56B.

In the modified example shown in FIG. 7, the groove portion 91 was formed in the third end surface 53, the protrusion 92 was formed in the fifth end surface 56A, and the groove portion 91 and the protrusion 92 were fitted together through recess-protrusion fitting, but the recess-protrusion relationship may also be reversed. That is, the protrusion 92 may be formed on the third end surface 53 and the groove portion 91 may be formed on the fifth end surface 56A.

In the modified example shown in FIG. 7, the recess 92 may be changed to a groove portion 91 recessed from the fifth end surface 56A. That is, the groove portion 91 may be formed in both the third end surface 53 and the fifth end surface 56A.

In the modified example shown in FIG. 7, the protrusion 92 may be omitted.

The mark 67 of the above-described embodiment may have both the recess 68 shown in FIG. 3 and the groove portion 91 and the protrusion 92 shown in FIG. 7.

In the above-described embodiment, the second mark indicating the maximum insertion amount of the first path restricting member 40 into the covering portion 51 was embodied as the restricting wall 60, but there is no limitation to this. For example, the second mark is not limited to a structure protruding inward in the radial direction of the covering portion 51 from the inner surface of the second main body portion 52, but may be changed to a structure recessed outward in the radial direction of the covering portion 51 from the inner surface of the second main body portion 52. For example, the second mark may be changed to a pattern formed on the inner surface of the second main body portion 52 by printing or engraving. Also, the formation position of the second mark is not limited to the inner surface of the second main body portion 52, and may be changed to the third end surface 53 or the fourth end surface 54, or may be changed to the fifth end surface 56A or the sixth end surface 56B.

The first distance L1 in the above-described embodiment can be changed as appropriate.

Figure 8:
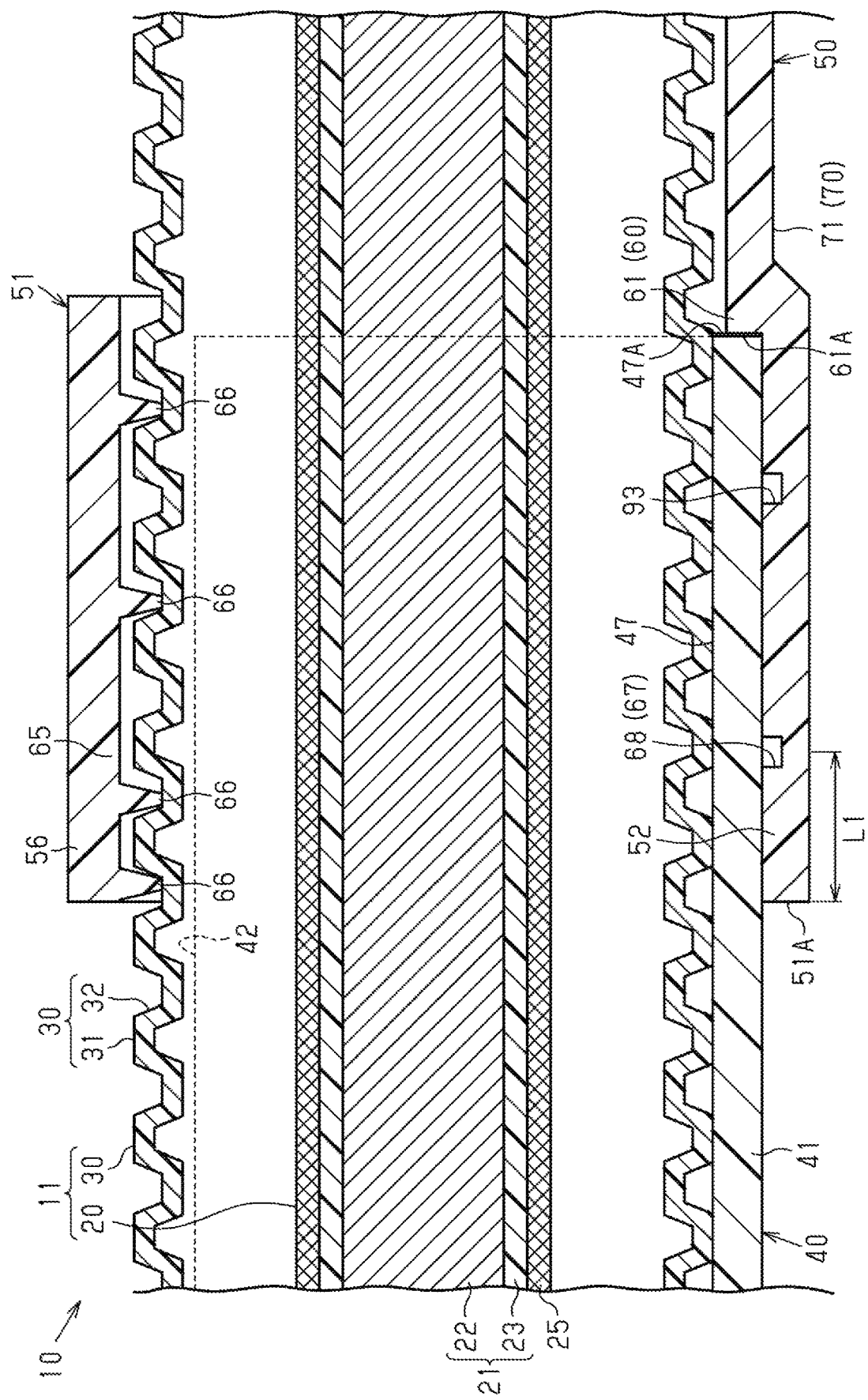
FIG. 8 is a schematic cross-sectional view showing a wire harness of a modified example.

For example, as shown in FIG. 8, the first distance L1 may be set shorter than the first distance L1 shown in FIG. 6. For example, as in the above-described embodiment, when the end portion in the lengthwise direction of the first path restricting member 40 is fixed to the outer surface of the exterior member 30 by the fixing member 81 (see FIG. 2), movement of the first path restricting member 40 in the lengthwise direction of the wire harness main body 11 is restricted. For this reason, in this case, the first distance L1 may be set to be short. When the first distance L1 is set to be short, the recess 68 that serves as the mark 67 is provided at a position shifted toward the second end surface 51A in the lengthwise direction of the covering portion 51, for example.

For example, as shown in FIG. 8, apart from the mark 67 indicating the minimum insertion amount and the restricting wall 60 indicating the maximum insertion amount, a third mark 93 indicating an insertion amount between the minimum insertion amount and the maximum insertion amount may be provided. The third mark 93 of this modified example is a recess formed so as to be recessed from the inner surface of the second main body portion 52. The third mark 93 is provided between the mark 67 and the restricting wall 60 in the lengthwise direction of the wire harness main body 11.

In the modified example shown in FIG. 8, the structure of the third mark 93 can be modified as appropriate. For example, the third mark 93 is not limited to a structure that is recessed outward in the radial direction of the covering portion 51 from the inner surface of the second main body portion 52, and may be changed to a structure that protrudes inward in the radial direction of the covering portion 51 from the inner surface of the second main body portion 52. For example, the third mark 93 may be changed to a pattern formed on the inner surface of the second main body portion 52 by printing or engraving. Also, the formation position of the third mark 93 is not limited to the inner surface of the second main body portion 52, and may be changed to the third end surface 53 or the fourth end surface 54, or may be changed to the fifth end surface 56A or the sixth end surface 56B.

In the above-describe embodiment, second path restricting members 50 may be provided on both sides in the lengthwise direction of the first path restricting member 40. At this time, for example, the first path restricting member 40 easily moves along the lengthwise direction of the wire harness main body 11 between one second path restricting member 50 and the other second path restricting member 50 in some cases. In this case, for example, the minimum insertion amount of the first path restricting member 40 with respect to the covering portion 51 is set to be large, and the first distance L1 is set to be long.

The structure of the second path restricting member 50 in the above-described embodiment can be changed as appropriate. For example, other structures are not particularly limited as long as the second path restricting member 50 has a structure that covers the connection portion 47 and has a covering portion 51 provided with the mark 67.

The protruding portion 66 of the lid portion 56 may be omitted.

The projecting portion 65 of the lid 56 may be omitted.

At least one of the body-side restricting wall 61 and the lid-side restricting wall 62 may be omitted.

In the covering portion 51 of the above-described embodiment, the second main body portion 52 and the lid portion 56 are formed in one piece with each other, but there is no limitation to this, and the second main body portion 52 and the lid portion 56 may also be separate from each other. That is, the second main body portion 52 and the lid portion 56 may be separate components.

The lid portion 56 of the covering portion 51 may also be omitted.

The bent shape of the path restricting portion 70 can be changed as appropriate.

The transverse cross-sectional shapes of the inner surfaces of the second main body portion 52 and the third main body portion 71 are not limited to U shapes, and can be changed to, for example, an arc shape, an elliptical arc shape, or the like.

A lid portion connected to the third main body portion 71 may be provided.

The second path restricting member 50 in the above embodiment was formed so as to restrict the path of the bent section 11B of the wire harness main body 11, but there is no limitation to this. For example, the second path restricting member 50 may be changed to a shape that restricts the path of the straight section 11A of the wire harness main body 11. The second path restricting member 50 in this case is changed, for example, to a shape in which the curved shape of the path restricting portion 70 extends linearly.

In the above-described embodiment, the attachment member (attachment) having the covering portion 51 was embodied in the second path restricting member 50, but there is no limitation to this. For example, the attachment member may be also embodied in a structure having only the covering portion 51.

The structure of the first path restricting member 40 in the above embodiment can be changed as appropriate. For example, as long as the first path restricting member 40 has the insertion port 42 and has a structure that can be attached to the outer circumferential surface of the exterior member 30, other structures are not particularly limited.

Each protruding portion 45 of the above-described embodiment may be provided at a position farther away from the insertion port 42 than the leading ends 43A and 44A in the circumferential direction of the first path restricting member 40.

Each protruding portion 45 may be partially provided in the lengthwise direction of the first path restricting member 40.

At least one of the two protruding portions 45 may be omitted.

The first path restricting member 40 may be provided with a second protruding portion that protrudes from the inner surface of the intermediate portion in the circumferential direction of the first main body portion 41 and can come into contact with the outer surface of the exterior member 30. According to this configuration, the protruding portion 45 and the second protruding portion can be brought into contact with the outer surface of the exterior member 30 together. Therefore, rattling of the first path restricting member 40 can be suppressed.

In the first path restricting member 40, a groove extending along the lengthwise direction may be provided on the outer surface of the first main body portion 41. According to this configuration, the first main body portion 41 is easily deformed to the outer peripheral side using the groove as a starting point, whereby the insertion opening 42 can be more easily expanded. As a result, it is possible to contribute to the improvement of the assemblability of the first path restricting member 40.

The thickness in the radial direction of the first main body portion 41 may be changed in the circumferential direction.

The transverse cross-sectional shape of the first main body portion 41 is not limited to an arc shape, but can be changed to, for example, an elliptical arc shape, a U shape, or the like.

In the above-described embodiment, the first path restricting member 40 and the second path restricting member 50 were harder than the exterior member 30, but there is no limitation to this, and the hardness may be less than or equal to that of the exterior member 30. That is, if the first path restricting member 40 and the second path restricting member 50 act so that the wire harness main body 11 is less likely to bend than the wire harness main body 11 in the state where the first path restricting member 40 and the second path restricting member 50 are not attached, the first path restricting member 40 and the second path restricting member 50 need not be harder than the exterior member 30.

At least one of the restricting members 91 and 92 in the above-described embodiment may be omitted.

For example, the exterior member 30 in the above-described embodiment may be a resin corrugated tube with a metal layer that contains a metal material, formed on the outer surface thereof.

The exterior member 30 in the above-described embodiment is not limited to being a corrugated tube, and may be an exterior member that is not provided with an annular protrusion 31 or an annular recess 32, for example.

The exterior member 30 in the above-described embodiment may have a slit that extends in the lengthwise direction of the exterior member 30.

Although the electric wires 21 in the above-described embodiment are high-voltage electric wires, the present disclosure is not limited to such a configuration. For example, the electric wires 21 may be low-voltage electric wires.

In the electric wire member 20 in the above-described embodiment, an electromagnetic shield member is embodied as the braided member 25. However, the present disclosure is not limited to such a configuration. For example, the electromagnetic shield member in the electric wire member 20 may be embodied as a metal foil.

The braided member 25 of the electric wire member 20 in the above-described embodiment may be omitted.

In the above-described embodiment, the number of electric wires 21 included in the electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate depending on the vehicle configuration.

In the above-described embodiment, a plurality of on-board devices to which the wire harness 10 is to be electrically connected are embodied as the inverter M1 and the high-voltage battery M2. However, the present disclosure is not limited to such a configuration. The plurality of on-board devices to which the wire harness 10 is to be electrically connected are not particularly limited as long as they are electric devices to be mounted in the vehicle V.

The embodiments disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

What is claimed is:

1. A wire harness comprising:
a wire harness main body including an electric wire and an exterior tube that covers an outer circumferential surface of the electric wire, the exterior tube comprising a plurality of recesses;
a path restrictor that is attached to an outer circumferential surface of the exterior tube and restricts a path of the wire harness; and
an attachment attached to an outer circumferential surface of a portion in a lengthwise direction of the path restrictor, wherein:
the path restrictor includes a first main body that covers a portion of the outer circumferential surface of the exterior tube and an insertion port that is open in a direction orthogonal to a lengthwise direction of the first main body and extends over an entire length in the lengthwise direction of the first main body,
the path restrictor has a connection connected to the attachment,
the attachment has a cover that covers an outer circumferential surface of the connection, the cover comprises:
    a mark indicating a necessary minimum insertion amount of the path restrictor into the cover in a lengthwise direction of the wire harness main body; and
    a plurality of protrusions that fit respectively into the plurality of recesses of the exterior tube, each protrusion being separate from the mark, and
the cover has a restricting wall that is engageable with a first end surface of the path restrictor in the lengthwise direction of the path restrictor, in the lengthwise direction of the wire harness main body.

2. The wire harness according to claim 1, wherein:
the restricting wall is provided at one end in a lengthwise direction of the cover,
the cover has a second end surface of an end on a side opposite to the restricting wall out of two ends in the lengthwise direction of the cover,
the mark is provided spaced apart from the second end surface by a first distance in the lengthwise direction of the wire harness main body, and
the first distance is a distance corresponding to the minimum insertion amount.

3. The wire harness according to claim 1, wherein:
the cover is formed in a ring shape that encloses, in a circumferential direction, an entirety of the outer circumferential surface of the connection and an entirety of the outer circumferential surface of the exterior tube at a portion where the connection is attached, and
the cover has a second main body that covers a portion of the outer circumferential surface of the first main body, and a lid that is coupled to the second main body.

4. The wire harness according to claim 3, wherein the mark is provided on an inner surface of the second main body.

5. The wire harness according to claim 4, wherein the mark extends over an entirety of a circumferential surface of the second main body in a circumferential direction of the cover.

6. The wire harness according to claim 4, wherein:
the mark has a recess that is recessed from the inner surface of the second main body, and
the recess is a recess that does not pass through the second main body in a radial direction of the cover.

7. The wire harness according to claim 3, wherein:
the second main body has a third end surface and a fourth end surface, which are both end surfaces in a circumferential direction of the second main body, and
the mark is provided on at least one of the third end surface and the fourth end surface.

8. The wire harness according to claim 1, wherein:
the path restrictor is a first path restrictor,
the attachment is a second path restrictor that is attached to an outer circumferential surface of the exterior tube and restricts the path of the wire harness main body,
the connection is provided at an end in a lengthwise direction of the first path restrictor,
the cover is provided at an end in a lengthwise direction of the second path restrictor,
the first path restrictor restricts a path of a straight section, which is a portion with a linear shape in the path of the wire harness main body, and
the second path restrictor restricts a path of a bend, which is a portion with a bent shape in the path of the wire harness main body.

9. The wire harness according to claim 1, wherein:
the minimum insertion amount mark is spaced from an end surface of the cover by a first distance, and
each protrusion among the plurality of protrusions is spaced from the end surface of the cover by a distance shorter than the first distance.

10. A wire harness comprising:
a wire harness main body including an electric wire and an exterior tube that covers an outer circumferential surface of the electric wire, the exterior tube comprising a plurality of recesses;
a path restrictor that is attached to an outer circumferential surface of the exterior tube and restricts a path of the wire harness; and
an attachment attached to an outer circumferential surface of a portion in a lengthwise direction of the path restrictor, wherein:
the path restrictor includes a first main body that covers a portion of the outer circumferential surface of the exterior tube and an insertion port that is open in a direction orthogonal to a lengthwise direction of the first main body and extends over an entire length in the lengthwise direction of the first main body;
the path restrictor has a connection connected to the attachment;
the attachment has a cover that covers an outer circumferential surface of the connection;
the cover comprises:
    a mark indicating a necessary minimum insertion amount of the path restrictor into the cover in a lengthwise direction of the wire harness main body; and
    a plurality of protrusions that fit respectively into the plurality of recesses of the exterior tube, each protrusion being separate from the mark;
the minimum insertion amount mark is spaced from an end surface of the cover by a first distance;
each protrusion among the plurality of protrusions is spaced from the end surface of the cover by a distance shorter than the first distance;
the minimum insertion amount mark is spaced from an end surface of the cover by a first distance;
each protrusion among the plurality of protrusions is spaced from the end surface of the cover by a distance shorter than the first distance;
the cover has a restricting wall that is engageable with a first end surface of the path restrictor; and
the restricting wall is spaced from the end surface of the cover by a distance longer than the first distance.

11. A wire harness comprising:
a wire harness main body including an electric wire and an exterior tube that covers an outer circumferential surface of the electric wire, the exterior tube comprising a plurality of recesses;
a path restrictor that is attached to an outer circumferential surface of the exterior tube and restricts a path of the wire harness; and
an attachment attached to an outer circumferential surface of a portion in a lengthwise direction of the path restrictor, wherein:
the path restrictor includes a first main body that covers a portion of the outer circumferential surface of the exterior tube and an insertion port that is open in a direction orthogonal to a lengthwise direction of the first main body and extends over an entire length in the lengthwise direction of the first main body,
the path restrictor has a connection connected to the attachment, the attachment has a cover that covers an outer circumferential surface of the connection, the cover comprises:
- a mark indicating a necessary minimum insertion amount of the path restrictor into the cover in a lengthwise direction of the wire harness main body; and
- a plurality of protrusions that fit respectively into the plurality of recesses of the exterior tube, each protrusion being separate from the mark, and the minimum insertion amount mark is recessed outward from an inner surface of the cover, in a radial direction of the cover, and does not pass through the cover in the radial direction of the cover.

\* \* \* \* \*